(12) United States Patent
Matteazzi et al.

(10) Patent No.: US 7,785,529 B2
(45) Date of Patent: Aug. 31, 2010

(54) METHOD AND APPARATUS FOR SINTERING OF INORGANIC MATERIALS AS WELL AS RESULTING OBJECTS

(75) Inventors: Paolo Matteazzi, Treviso (IT); Hinrich Becker, Hemmingen (DE)

(73) Assignees: MBN Nanomaterialia SpA, Vascon di Carbonera (TV) (IT); LZH Laser Zentrum Hannover E V., Hannover (DE)

( * ) Notice: Subject to any disclaimer, the term of this patent is extended or adjusted under 35 U.S.C. 154(b) by 1123 days.

(21) Appl. No.: 10/581,324

(22) PCT Filed: Nov. 18, 2004

(86) PCT No.: PCT/EP2004/013097

§ 371 (c)(1),
(2), (4) Date: Jun. 1, 2006

(87) PCT Pub. No.: WO2005/053860

PCT Pub. Date: Jun. 16, 2005

(65) Prior Publication Data

US 2009/0042050 A1     Feb. 12, 2009

(30) Foreign Application Priority Data

Dec. 5, 2003   (IT) .......................... TV2003A0155

(51) Int. Cl.
*C22C 1/04* (2006.01)
(52) U.S. Cl. ............................................. 419/23; 419/7
(58) Field of Classification Search ................... 419/23, 419/7
See application file for complete search history.

(56) References Cited

U.S. PATENT DOCUMENTS

| 5,321,228 A * | 6/1994 | Krause et al. .......... 219/121.84 |
| 6,046,426 A | 4/2000 | Jeantette et al. |
| 6,391,251 B1 * | 5/2002 | Keicher et al. ................. 419/7 |

(Continued)

FOREIGN PATENT DOCUMENTS

DE     200 20 614 U1     4/2001

(Continued)

OTHER PUBLICATIONS

"EOS brings very fine laser build powders to the UK", Metal Powder Report, MPR Publishing Services, Shrewsbury, GB, vol. 58, No. 9, Sep. 2003, p. 13, XP004454476, ISSN: 0026-0657.

(Continued)

*Primary Examiner*—Roy King
*Assistant Examiner*—Weiping Zhu
(74) *Attorney, Agent, or Firm*—Wenderoth, Lind & Ponack L.L.P.

(57) ABSTRACT

The invention refers to a method and an apparatus for fabricating a tridimensional solid object by sintering inorganic particles of controlled size distribution. The particles are directed onto a target area in a powdery stream in the shape of a conical surface which is coaxial to a simultaneous heating flux while an at least bidimensional relative movement is maintained between the target area, the powdery stream and the heating flux. As a result the particles sinterization occurs in a single operation directly onto the target area.

16 Claims, 4 Drawing Sheets

U.S. PATENT DOCUMENTS

| | | | |
|---|---|---|---|
| 6,401,001 B1 * | 6/2002 | Jang et al. | 700/118 |
| 6,656,409 B1 | 12/2003 | Keicher et al. | |
| 2001/0008230 A1 | 7/2001 | Keicher et al. | |
| 2003/0206820 A1 | 11/2003 | Keicher et al. | |
| 2005/0133527 A1 | 6/2005 | Dullea et al. | |

FOREIGN PATENT DOCUMENTS

| | | |
|---|---|---|
| WO | 93/00171 | 1/1993 |
| WO | 01/56736 | 8/2001 |
| WO | 2004/091834 | 10/2004 |

OTHER PUBLICATIONS

A. Simchi, "The Role of Particle Size on the Laser Sintering of Iron Powder", Metallurgical and Materials Transactions B: Process Metallurgy & Materials Processing Science, The Materials Information Society, US, vol. 35B, No. 5, Oct. 2004, pp. 937-948, XP001214017, ISSN: 1073-5623.

* cited by examiner

METHOD AND APPARATUS FOR SINTERING OF INORGANIC MATERIALS AS WELL AS RESULTING OBJECTS

FIELD OF THE INVENTION

The present invention refers to the fabrication of tridimensional solid objects from at least one inorganic material such as metals, alloys, ceramics, carbides, etc. in the form of powder, and to the resulting objects.

DESCRIPTION OF THE RELATED ART

The so-called laser sintering technique is known in particular through the disclosure made by quite a number of documents, including the following.

In the U.S. Pat. No. 4,863,538 assigned to the University of Texas, it is disclosed to build up an object by depositing a powdery material in successive layers which are independently sintered by a laser beam, soon after their deposition on a target area on a target area of a predetermined cross-section. The cross-section of a chosen diameter of laser beam is scanned over each layer and the beam is switched on to sinter only the powder lying within the predetermined cross-section under a control by computer means. This fabrication method is time consuming, thus of a low objectivity, in consideration of the alternate operation of the powder depositing means and of the laser beam.

In the U.S. Pat. No. 5,730,925 assigned to EOS GmbH it is disclosed to apply smooth successive layers of a powdery material on a plane support means by the use of a coating device which is moved two times back and forth in a direction parallel to the upper surface of the support means. The powder is subsequently "solidified" by a radiating laser beam which is directed onto each one of the smooth layers. For the functional similarity with the above discussed system the objectivity of this method is also relatively low and the efficiency of the radiating energy is also low whenever the laser beam, which is deflected by a tilting mirror, has a direction other than perpendicular to the smoothed layer of powder.

In the U.S. Pat. No. 5,904,890, also assigned to EOS GmbH and constituting an improvement on U.S. Pat. No. 5,730,925, it is disclosed to scan the radiating laser beam on each layer of powder in a pattern comprising a plurality of parallel adjacent lines of a different length, the beam having a travelling speed decreasing with increasing length of the line. Even if this system has a higher efficiency as regards the radiating energy, the objectivity remains relatively low in consideration of the alternate operation of the powder depositing means and of the scanning beam.

At last, U.S. Pat. No. B1-6,391,251 and WO-A-01/56736 belong to the patent literature disclosing methods for fabricating tridimensional solid objects by melting, i.e. bringing to the liquid state, powdery material with the use of laser beams (such methods being also known as laser cladding) and WO-A-93/00171 discloses a nozzle comprising a pair of coaxial cones for supplying a powder entraining gas so that it is melted by a laser beam and forms a liquid bath.

SUMMARY OF THE INVENTION

It is a main goal of the present invention to provide a sintering system which is more efficient, of a higher objectivity and simpler than those discussed above.

Another goal of the invention is to obtain tridimensional objects of an even more complex shape and of dimensions of less than 10 mm with a spatial resolution (range gating) considerably better than 50 that is much below the value of 100 μm which is considered as the limit value in the more recent literature.

Still another goal is to make use of particles consisting of crystallites of dimensions also considerably lower than 100 nm (i.e. $10^{-7}$ m) and obtained, for example, by means of the high energy and high capacity ball mill disclosed in the European patent 665 770. The crystallites can be not only of a single material (i.e. single-phase) but also of two or three different materials (i.e. multi-phase) and form a powdery stream subjected to a localized heating in the laser beam.

These goals, as well as other aims discussed here below, are obtained by the method and the apparatus which characterize the present invention according to the appended claims.

The objects fabricated by said method and/or by said apparatus are also claimed here below.

BRIEF DESCRIPTION OF THE DRAWINGS

The following description, with reference to the accompanying drawings of a few preferred but not exclusive embodiments, will explain the features of the invention and the resultant advantages.

PREFERRED EMBODIMENTS OF THE INVENTION

As already discussed in the preceding paragraphs, the invention refers to the fabrication of tridimensional solid objects which uses, as a raw material, a powder, consisting of particles of one or more inorganic materials (phases) like metals, alloys, ceramics, carbon, carbides etc. The powder is preferably multi-phase so that one phase does not exceed 85% in volume while the sum of the other phases is at least 15% in volume and has a melting temperature below 80% of the melting temperature in ° C. of the first phase.

Many other examples of usable powder could be mentioned and are accessible from the metallurgical literature such as:

| First phase | | Second phase | |
|---|---|---|---|
| Metal or alloy | Melting temp. [° C.] | Metal or alloy | Melting temp. [° C.] |
| Fe | 1535 | FeP (10 wt % P) alloy | 1050 |
| Fe | 1535 | FeC (4.2 wt % C) alloy | 1150 |
| Ti | 1670 | Sn | 230 |
| Cu | 1083 | Sn | 230 |
| Cu | 1083 | Zn | 420 |
| Fe | 1535 | FeCu alloy | 1083 ÷ 1535[(+)] |
| Ti | 1670 | Ti—Sn alloy | 230 ÷ 1670[(+)] |

[(+)]= temperature depending on the actual composition of the alloy.

Powders consisting of iron (first phase), having a melting temperature of 1535° C., and copper (second phase), having a melting temperature of 1083° C., namely about 70% of the iron melting temperature proved to be particularly usable for the intended aims.

Figure 1:
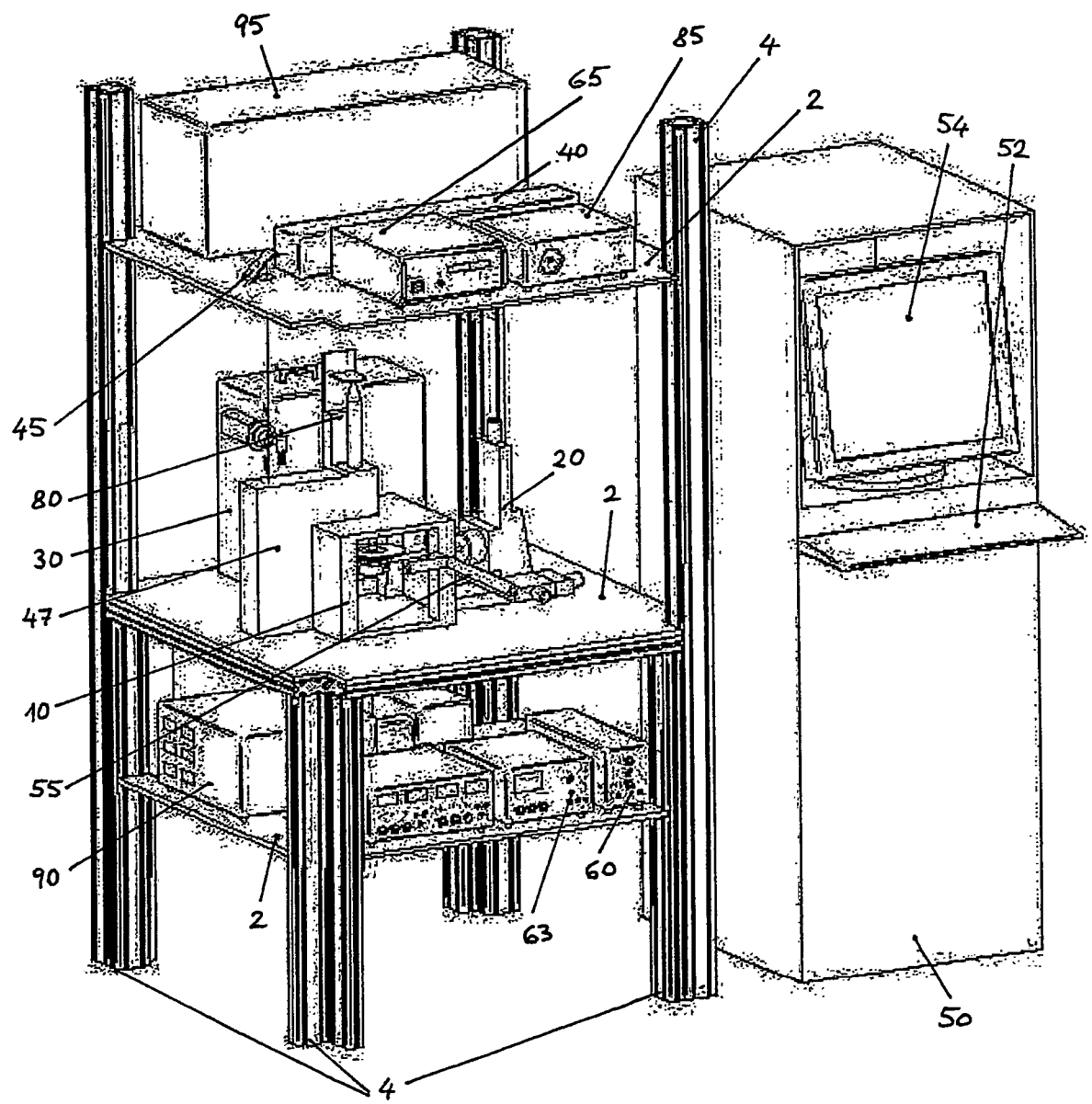
FIG. 1 shows an overall view of an example of apparatus for fabricating tridimensional solid objects according to the invention.

With reference to FIG. 1, an apparatus according to the invention basically consists of the following units, most of which are described in more detail in the subsequent paragraphs:

a device 10, in which the object is formed;

a feeding unit 35 in which a solid aerosol is obtained by mixing the single-phase or multi-phase powder with an inert carrier gas like argon, helium, nitrogen or composites thereof, supplied from a reservoir 90. The powder is produced in a step preceding the method of the present invention by causing crystallites of less than 100 nm ($10^{-7}$ m) to agglomerate into particles of a controlled size. For the fabrication of highly precise objects, or parts thereof like their periphery, about 90% in weight of the powder may consist of particles comprised in the dimensional range 0.5 to 20 µm ($5 \times 10^{-7}$ to $2 \times 10^{-5}$ m).

a device 30 which receives the powder from the feeding unit 35 and ensures its introduction as a powdery stream into a target area arranged in the forming device 10;

a generator 45 of a heating flux consisting of an emitter capable of generating a laser beam LB and of addressing this beam into the forming device 10 thanks to an aiming device 47. In order to achieve the above mentioned spatial resolution a high-quality laser beam must be used such as a pumped diode Yb:YAG (ytterbium:yttrium-aluminium-garnet) disk laser or a fiber laser and a suitable optical system for guiding and forming the laser beam LB to the aiming device 47. An electron beam with comparable or even better performance can also be used;

a programmable control unit 50 including a keyboard 52 and a monitor 54.

In a conventional manner, for example, by means of an electric harness (not shown), the control unit 50 is connected to the above listed functional units as well as to the following ancillary units, all of which are positioned on various shelves 2 fixed to the columns 4 of a supporting structure;

ultrasonic devices 60 associated to the powder feeding unit 35 and adapted to prevent the deposit of the powder particles in form of agglomerates by keeping the particles detached from parts of the feeder by vibrating at high frequency;

a device 62 for monitoring the oxygen content in the chamber 10, which shall not exceed 100 ppm;

a device 65, for example a high resolution CCD camera, for an on-line shape and thickness control of the object fabricated;

a system for monitoring the temperature inside the forming chamber 10 which preferably includes a pyrometer optical viewer 80 and an associated control box 85. In order to achieve the above mentioned spatial resolution, the pyrometer must have a resolution better than 100 µm in a temperature range of 1000 to 3000° C. and is installed on the optical axis of the laser beam;

a microscope unit 55 for viewing an object during its fabrication inside the forming device 10;

a cooling unit 95.

Figure 2:
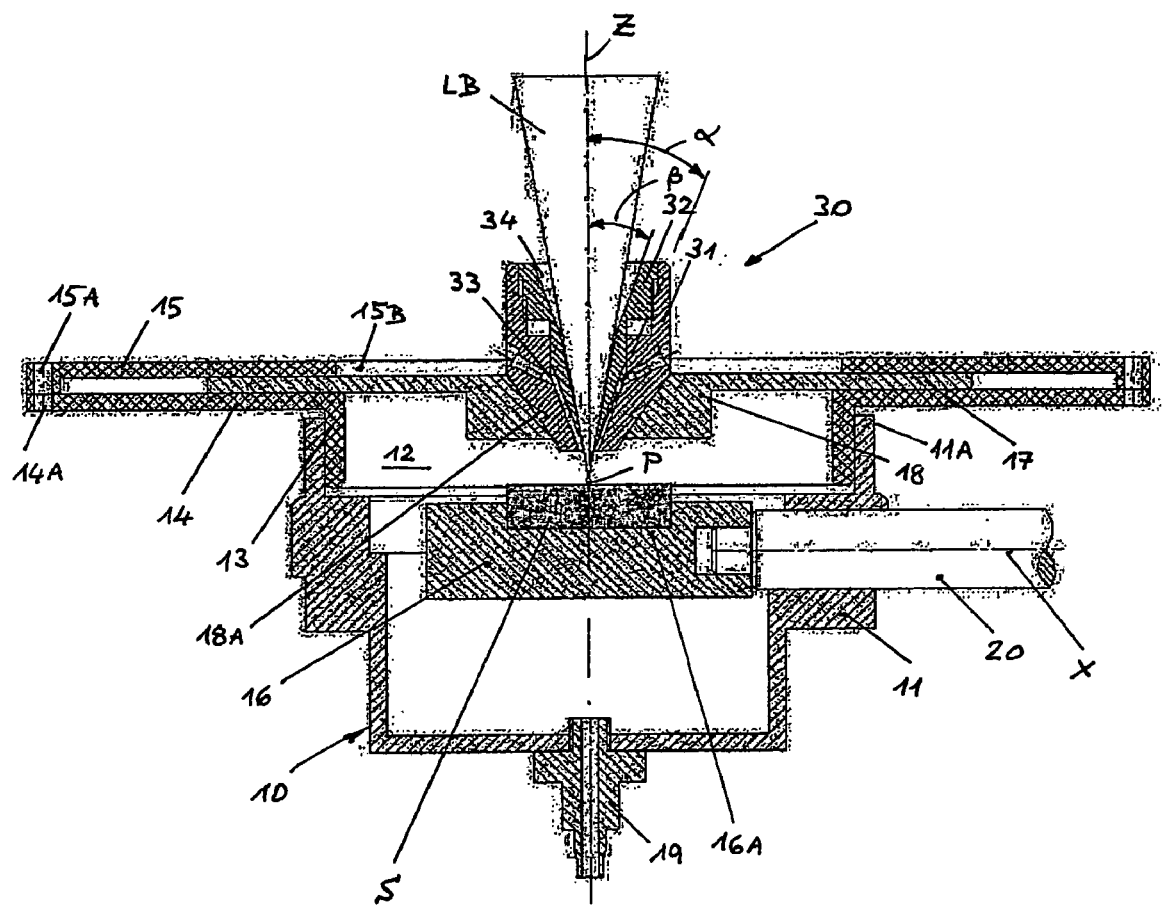
FIG. 2 shows a front and partially cross-sectioned view on an enlarged scale of a first embodiment of the parts of the apparatus where the objects are physically fabricated.
Figure 3:
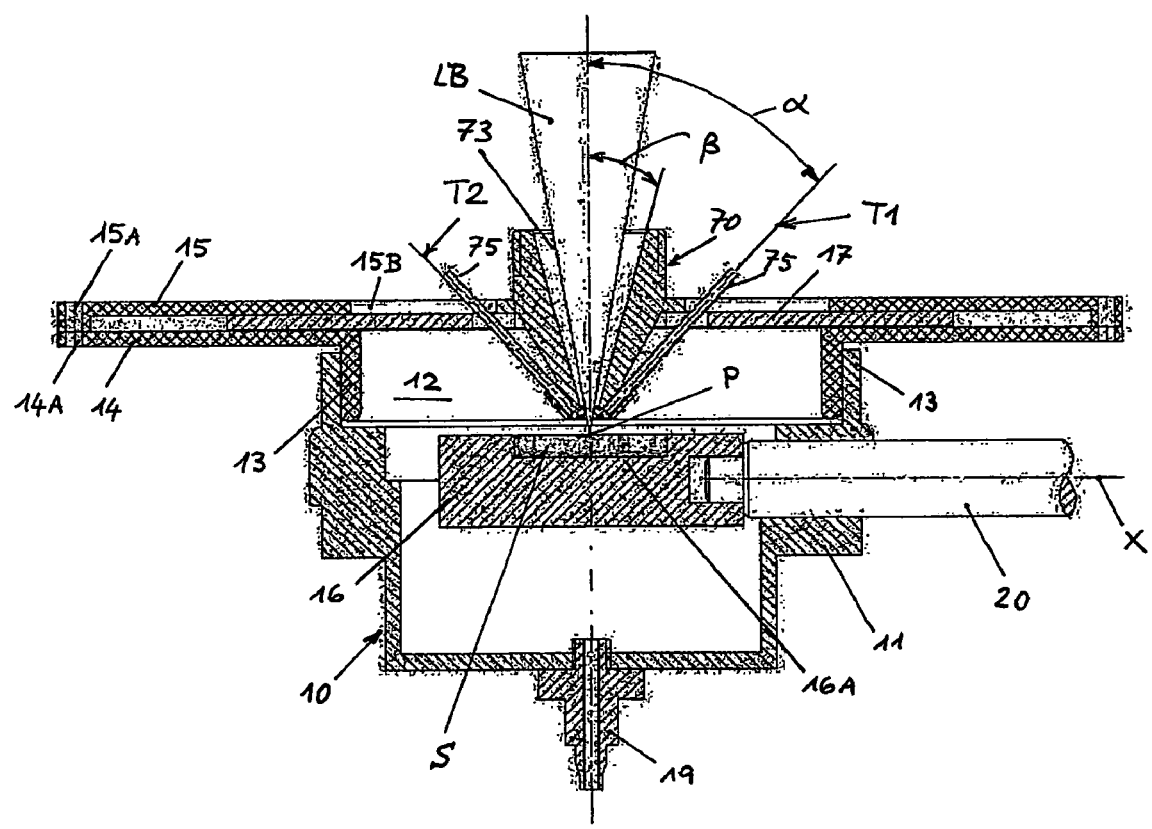
FIG. 3 shows a front and partially cross-sectioned view on an enlarged scale of a second embodiment of the parts of the apparatus where the objects are physically fabricated.

With reference now to a first embodiment of the invention, shown in detail in FIG. 2, it can be seen that the forming device 10 comprises a lower or first disc 14 and an upper or second disc 15. The first disc 14 has a central round opening defined by a rim 13 extended downwards and a flat outer periphery with a plurality of threaded holes 14A. The second disc 15 has an outer rim which protrudes downwards and is provided with threaded holes 15A corresponding to the holes 14a so as to permit the mutual fixation of the discs 14 and 15 by means of screws (not shown). The gap between the facing flat portions of the discs 14 and 15 is such to allow the arrangement in between, with some clearance, of an intermediate or third disc 17, which is aligned with the other discs. The second disc 15 is provided with a central round opening 15B, somewhat larger than the corresponding central opening of the first disc 14.

The upper portion 11A of a cup 11 is fitted with some clearance around the rim 13 of the first disc 14 and connected to known driving means so as to slide along said rim. A forming chamber 12 is thus defined by the interior of the rim 13, beneath the third disc 17, and by a rigid base 16 with the target area where the object is fabricated, the base 16 being movably supported by a horizontal shaft 20 passing through the lateral wall of the cup 11. In the embodiment illustrated in FIG. 2 the target area is a rigid substrate S carried by a recess 16A in the upper face of the base 16. In conformance with the expected results, the substrate S can be made and positioned in the forming chamber 12 so as to form a part of the surface of the object to fabricate which is different from the remaining parts. Alternatively, when the object fabricated is self-supporting, the substrate S can merely form a part detachable from the sintered material at the end of fabrication. According to a feature of the invention, the cup 11 and the shaft 20 are connected to separate conventional driving means (not shown), such as ultrafine stepper motors, as better clarified here below.

The atmosphere inside the forming chamber 10 is monitored by suitable sensing means (not shown), which are connected to the device 62 for monitoring the content of oxygen, which preferably shall not exceed 100 ppm. Additionally the bottom of cup 11 is connected by known tube means and a fitting 19 to a vacuum pump (not shown) providing a depression down to $10^{-2}$ bar in the forming chamber 12 assisting the particles feeding and collecting the needless residuals of the powder.

The radially inner region of the third disc 17 is in the form of a thick hub 18 of a smaller diameter than the central aperture 15A of the second disc 15. A frustoconical aperture 18A, which is aligned along the axis Z and of a cross section decreasing in the direction of the cup 11, is provided in the hub 18 and the already mentioned device 30 is arranged in said aperture 18A.

In this embodiment, the device 30 comprises an outer cone 31 (more precisely, a frustum of a cone) and an inner cone 32 (also, actually, a frustum of a cone) which are aligned along the axis Z and accommodated in the frustoconical aperture 18 of the hub-like region 16 of the third disc 17.

The outer and the inner cones 31, 32 are arranged one inside another so as to create a substantially annular gap 33 of a width lesser than 1 mm in order to obtain the desired speed of the powdery stream. The cones 31, 32 are connected to one another by rods (not shown) to vary their mutual adjustment, and consequently the width of the gap 33 preferably in the range 0.1 to 0.8 mm. In any case, the powdery stream has the shape of a conical surface having its vertex in a point P of the target area, namely of the substrate S in the illustrated embodiment. The speed of the powdery stream does not exceed 20 m/s.

The inner cone 32 of the device 30 has a frusto-conical channel 34 for the laser beam LB, as better described herebelow, which is aligned along the axis Z and has a cross-section decreasing in the direction of the cup 11 of the forming chamber 10. The vertex angle of channel 34 is designated by β in FIG. 2.

Figure 4:
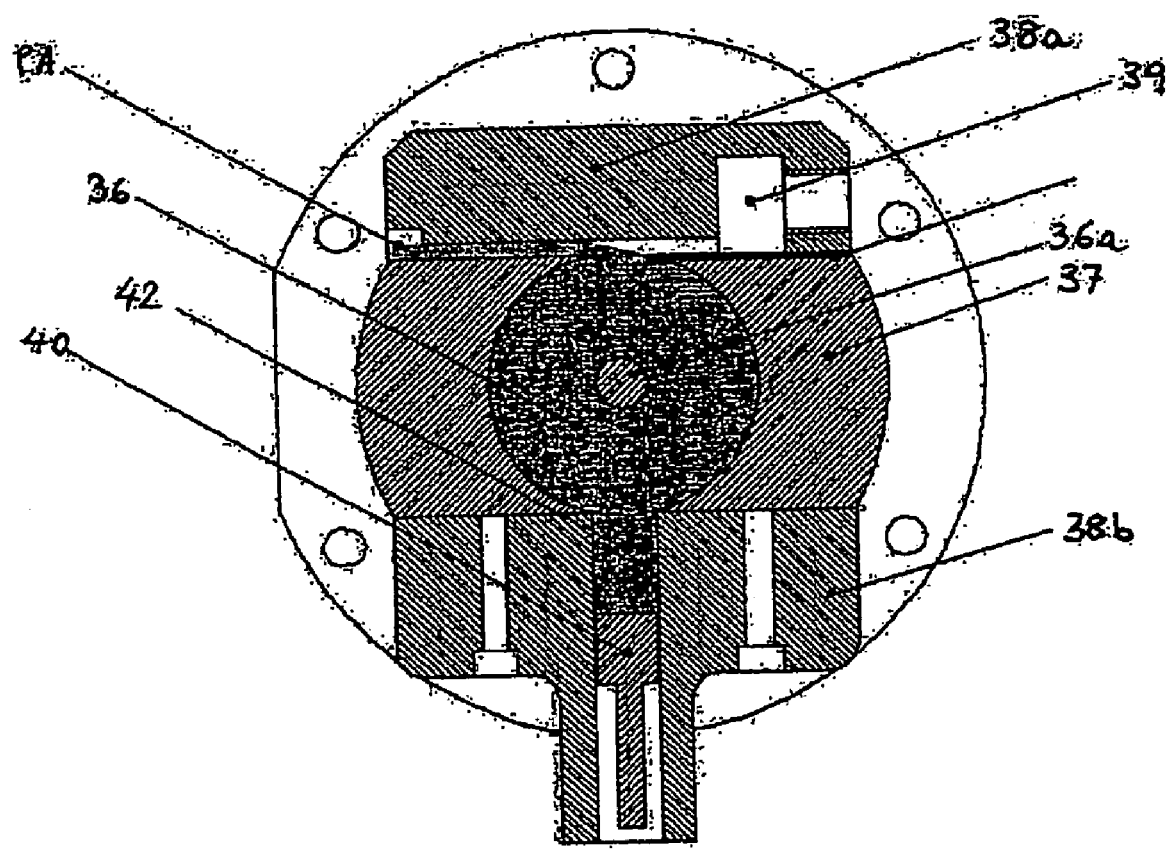
FIG. 4 is a transversal cross-sectional view of the powder feeding unit which is an essential part of the apparatus of the invention.

The unit 35 for feeding the powder to the device 30—which is best seen in FIG. 4 and plays an important role in the invention—substantially consists of a bristled brush 36 fixed onto a motorized axle 36a so as to rotate clockwise. The brush 36 is accommodated in a housing 37 having a top cover 38a with an aperture 39 which is connected to the reservoir 90 of the carrier gas as well as a bottom cover 38b. The brush 36 serves for the ablation of the particles supplied from a reservoir 42 where they are stored in solid form. A piston 40, housed in the bottom cover 38b, urges the powder stored in reservoir 42 against the upstream side of the brush 36. A flat element 41, arranged tangentially to the brush 36 at its downstream side, pushes the elastically deformable bristles of the rotating brush 36, catapulting the particles out of the brush 36 while reaching non deformation status and producing a solid aerosol PA starting from the ablated particles and the carrier gas supplied through the aperture 39. More details about a powder feeding unit of the described type and its use can be found in the German Utility Model 200 20 614 U1, published on Dec. 4, 2001, which is expressly incorporated here by reference. Due to this construction of the feeding unit 35 the particles in the solid aerosol PA have a controlled dimensional distribution, in particular 90% in weight of the particles are of a dimension in the range 0.5 to 20 μm. The powder feeding unit can also be constructed in such a way to comprise two or more powder reservoirs, each of them containing one material type powder, as mentioned above.

According to an important feature of the invention, the solid aerosol PA produced in the powder feeding unit 35 as above described, is fed to the device 30 wherefrom it comes out into the forming chamber 12 through the annular gap 33. The solid aerosol PA constitutes the powdery stream with the shape of a conical surface having its vertex P positioned on the target area, namely the substrate S in the illustrated embodiment, and Z is the axis of said conical surface which has a vertex angle $\alpha$ of less than 45°. At least during the formation of the object in the present apparatus, the cones 31 and 32 and the rods connecting said cones to one another are kept vibrating by the ultrasonic device 60. Thus the particles in the solid aerosol PA are prevented from agglomerating and adhering to the mutually facing inner surfaces of the cones 31 and 32 that define the gap 33.

According to another important feature of the invention, the laser beam LB—which is generated by the source 45, addressed by the aiming device 47 which is formed by a conventional arrangement of optics—is caused to pass through the conical channel 34 of the inner cone 32 of the device 30 and consequently is of a conical shape with an angle substantially equal to the vertex angle $\beta$ of the channel 34. The angle $\beta$ of the conically shaped laser beam LB is in any case lesser than the corresponding vertex angle $\alpha$ of the simultaneously generated conical powdery stream. The laser beam LB is, according to still another feature of the invention, correlated to the dimensional distribution of the particles in the powdery stream, namely the majority of the size distribution in weight of the particles does not exceed the width of the laser beam LB. In particular, when objects of a high precision, or portions thereof like their contours, are fabricated, a dimensional distribution in weight of the particles is selected such that about 90% of particles have a size comprised in the range 0.5 to 20 μm and the focus diameter of the laser beam LB consequently does not exceed 20 μm. For further applications, where such a high precision of the fabricated objects is either not required or only required on specific portions of the objects, it is foreseen to extend the focus diameter up to dimensions of 150 μm with a corresponding increase in the particles size in the powder stream.

According to the invention, an object is fabricated as follows. The solid aerosol PA (consisting of one or more phases, as above specified) is fed from the unit 35 to the device 30 and herein becomes a powdery stream of a conical shape which is directed into the forming chamber 12, more precisely towards the target area, namely the substrate S in the illustrated embodiment.

Simultaneously the laser beam LB is also focused onto the vertex P of the conically shaped powdery stream, which lies onto the target area (substrate S). In the meantime, throughout the fabrication of the desired object, at least bidimensional relative movement is maintained between the target area, the powdery stream and the laser beam thanks to the already mentioned driving means. In the illustrated embodiment, the cup 11 is moved up and down along the rim 13 in the direction of the vertical axis Z and possibly also rotated around the same axis while the entire device 30 is moved on a horizontal plane with the third disk 17 in the gap between the flat faces of the first and second disc 14 and 15 and the base 16 is also rotated, if necessary, around the horizontal axis X with the shaft 20. All of the said movements are controlled by the programmable control unit 50 in accordance with the design of the object to fabricate.

Due to the above described features, the powder of the solid aerosol PA is sintered instantaneously and in a single step directly onto the substrate S, thus fabricating a tridimensional solid object as desired and designed with the help of a CAD/CAM system. In particular the invention permits the realization of tridimensional solid objects having a range gating which is not only better than 50 μm but even lower than 10 μm.

The following factors play an important role in the claimed achievement:

the highly precise monitoring of the sintering temperature which is ensured by a control of the power of the laser beam LB performed through a PID (Proportional gain-Integral-Derivative) algorithm. This factor is of a particular importance for a good and industrially reproduceable quality of the object fabricated according to the invention;

the implementation of an on-line shape and thickness control allowing the checking of the actual status of the object fabrication;

the implementation of an offline visual control realised by an electronic microscope of high resolution which enables on one hand viewing the results achieved and on the other hand evaluating the spatial resolution achieved;

the control of the oxygen contents within the forming chamber 12;

the adoption of Hot Isostatic Pressing (HIP) allowing the elimination of any internal residual porosity and the achievement of a full density in the fabricated object.

FIG. 3 illustrates a second embodiment of the apparatus of the invention which is particularly advantageous when the inorganic material used to obtain the solid aerosol PA consists of two or more than two phases. Since most parts remain the same as the preceding embodiment, they retain the same reference numeral and are not described another time. Also the resulting method is the same as the first embodiment.

The laser beam LB is directed through the conical channel 73 of a pointer 70 onto the target area, namely onto the substrate S positioned in the recess 16A of the base 16, arranged inside the forming device 10, wherein reference numeral 12 again designates the forming chamber. The pointer 70 is supported through adjustable means (not shown) by the third disc 17, which also supports a plurality of thin pipes 75, which are connected to corresponding feeding units (which are of the above described type) of the various phases of the inorganic material used to obtain the solid aerosol PA.

The pipes 75 are supported by the third disc 17 in such a manner that their axis T1, T2, etc are arranged at an angle α not exceeding 45° and are kept vibrating during the operation of the apparatus. Thus, the resulting powdery stream is in the shape of a conical surface having as vertex a point P on the target area (namely the substrate S in the illustrated embodiment) and the vertex angle α (of less than 45°, as above mentioned) is wider than the vertex angle β of the cone-shaped laser beam LB, which is determined by the channel 73 of the pointer 70. As a result, the powdery stream obtained from the solid aerosol PA is sintered instantaneously and in a single step directly on the target area (substrate) S and the desired tridimensional object is fabricated thanks to the at least bidimensional relative movement between the target area, the powdery stream and the laser beam ensured by the above mentioned driving means.

From the preceding description the advantages of the invention can be summarized as follows:

(a) the fabrication of a tridimensional solid object takes place in a single step due to the fact that the powder is directly sintered by the laser beam. Then the fabrication is more efficient, from the industrial point of view, than when the methods and apparatuses of the state of art are utilized;

(b) the inorganic materials used can consist also of two or more powder types (each consisting of different phases) which can be fed in different moments under the laser beam LB. In said case the power of the laser beam can be selected in order to obtain that only the phases of a lower melting temperature are actually melted at the vertex of the conical surface of the powdery stream. In this way, different materials types can be deposited in a single layer, and the whole part can be constructed with different materials gradients on the scale of the spatial resolution;

(c) the precision obtainable is high due to the mechanical interconnection between the means generating and directing the powder stream and the means directing the laser beam;

(d) a high objection rate can be obtained due to the small dimensions of the particles in the powdery stream and of the laser beam and also due to the uniformity ensured by keeping vibrating the nozzle and the supply pipes which generate the powdery stream, so that the powder is prevented from adhering thereto;

(e) since it is possible to adjust either the width of the gap in the device 30 of the first embodiment or the angular arrangements of the supply tubes 75 in the second embodiment, the production rate can be varied.

Other embodiments and variants of the invention should be developed within the scope of the appended claims, such as:

instead of moving the cup in the forming chamber, the laser beam and the nozzle and the supply pipes which generate the powdery stream should be moved to obtain the at least bidimensional relative movement;

the powdery stream should be addressed directly onto a target area where no substrate is provided;

instead of by a laser beam, the heating flux for sintering the inorganic materials should be generated either by an induction coil coaxial to the powdery stream or by an infrared heater or by an electron beam or by a microwave generator

The invention claimed is:

1. A method for fabricating a tridimensional solid object by sintering inorganic particles with a controlled size distribution, the method comprising:

simultaneously directing at least one powdery stream of the inorganic particles and at least one heating flux onto a rigid target area; and maintaining at least bidimensional relative movement between the rigid target area, the powdery stream, and the heating flux during said directing operation, wherein the powdery stream is shaped as a cone with a vertex angle of the cone not exceeding 45°, the powdery stream being directed such that a longitudinal axis extends in a direction of the heating flux and a vertex of the cone is disposed on the rigid target area, wherein a dimensional distribution of the inorganic particles is selected such that about 90% by weight of the inorganic particles are 0.5 to 20 μm in size, wherein the inorganic particles are composed of agglomerated crystallites of less than $10^{-7}$ m in size, wherein said powdery stream includes the inorganic particles mixed with at least one carrier gas so as to constitute a solid aerosol, wherein the heating flux has a width on the rigid target area not exceeding 20 μm, wherein the inorganic particles are composed of at least two phases:
   a first phase which constitutes 85% or less of the powdery stream by volume, the first phase having a first melting temperature in degrees Celsius; and
   at least one other phase, the at least one other phase constituting at least 15% by volume of the powdery stream and having a melting temperature in degrees Celsius which is lower than 80% of the first melting temperature, and wherein the solid object is fabricated by sintering the inorganic particles directly onto the rigid target area such that only the inorganic particles of the at least one other phase are melted.

2. The method of claim 1, wherein the powdery stream is directed onto the rigid target area at a speed not exceeding 20 m/s.

3. The method of claim 1, wherein the rigid target area comprises a rigid substrate positioned onto a rigid base, the rigid base being movably supported in a forming chamber,
   wherein the forming chamber extends below the rigid base in the form of a cup which is maintained at a controlled atmosphere with an oxygen content not exceeding 100 ppm through a depression created in the forming chamber.

4. The method of claim 1, wherein the inorganic particles are prevented from agglomerating and adhering during flow before being directed onto the target area by means of ultrasounds.

5. The method of claim 1, wherein fabrication is entirely controlled by a CAD/CAM system.

6. The method of claim 1, wherein the heating flux consists of a cone-shaped laser beam having a vertex angle less than the vertex angle of the powdery stream.

7. The method of claim 6, further comprising:
   increasing a focus diameter of the laser beam up to 150 μm and correspondingly increasing the size of the inorganic particles in the powdery stream when a spatial resolution of the solid object better than 50 μm is not required.

8. The method of claim 1, wherein the heating flux is generated by a means selected from the group consisting of: an electromagnetic induction coil arranged coaxially to the powdery stream, a radiant heat generator, an infrared heater, an electron beam, and a microwave generator.

9. The method of claim 1, further comprising a step of isostatic pressing at high temperature to eliminate any internal residual porosity and achieve a full density in the solid object.

10. The method of claim 2, wherein the heating flux consists of a cone-shaped laser beam having a vertex angle less than the vertex angle of the powdery stream.

11. The method of claim 3, wherein the heating flux consists of a cone-shaped laser beam having a vertex angle less than the vertex angle of the powdery stream.

12. The method of claim 4, wherein the heating flux consists of a cone-shaped laser beam having a vertex angle less than the vertex angle of the powdery stream.

13. The method of claim 5, wherein the heating flux consists of a cone-shaped laser beam having a vertex angle less than the vertex angle of the powdery stream.

14. The method of claim 1, wherein the solid object is fabricated in a single operation by sintering, and only the inorganic particles of the at least one other phase are melted during said single operation.

15. The method of claim 1, wherein the at least two phases of the inorganic particles are directed onto the rigid target area in different selectable powdery streams.

16. The method of claim 1, wherein the solid object has a spatial resolution better than 50 μm.

* * * * *